COLOR SYNCHRONIZATION
Filed July 23, 1951
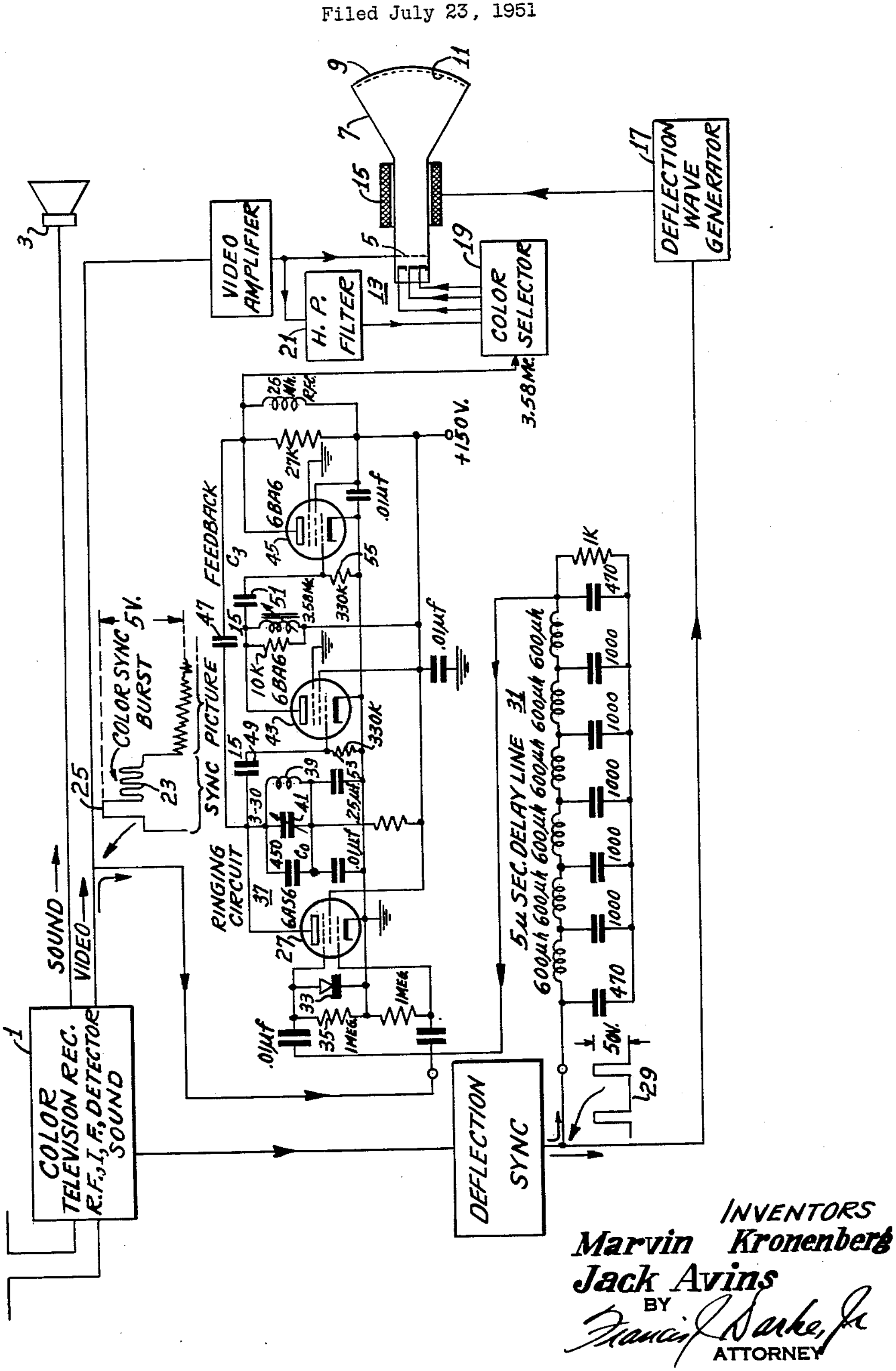
INVENTORS
Marvin Kronenberg
Jack Avins
BY
Francis J. Darke, Jr.
ATTORNEY

United States Patent Office 2,712,568

Patented July 5, 1955

2,712,568

COLOR SYNCHRONIZATION

Jack Avins, Staten Island, and Marvin Kronenberg, Queens Village, N. Y., assignors to Radio Corporation of America, a corporation of Delaware Application July 23, 1951, Serial No. 238,162

11 Claims. (Cl. 178—5.4)

The present invention relates to signalling circuits and more particularly to color synchronization of the type employed in color television receivers.

Color television is the reproduction on the viewing screen of a receiver of not only the relative luminescenses or brightness but also the color hues and saturations or chromaticities of the details in the original scene.

Complete cooperation between the transmitter and receiver is essential in the successful operation of television equipment. As a result, much emphasis is placed on the development and utilization of synchronizing methods. This is especially true in color television wherein not only is it necessary to maintain accurate deflection scanning but it is also necessary to maintain accurate synchronism in the timing of component color selection.

The electrical transfer of images in color may be accomplished by additive methods. Additive methods produce natural color images by breaking down the light from an object into a predetermined number of selected primary or component colors. Color images may be transferred electrically by analyzing the light from an object into not only its image elements as is accomplished by a normal scanning procedure but by also analyzing the light from elemental areas of object or images into selected primary or component colors and deriving therefrom a signal representative of each of selected component colors. A color image may then be reproduced at a remote point by appropriate reconstruction from a component color signal train.

In order to utilize the existing radio frequency spectrum most advantageously there has been proposed a color television system based upon the signal multiplex principal which will be referred to herein as a "phase and amplitude modulated sub-carrier wave" type. In such a system, the video signal components representative of the brightness detail are transmitted substantially in the usual manner for transmission of the black and white television signals. Color information is employed to modulate a sub-carrier wave having a carrier frequency within the frequency pass-band of the aforementioned video signals carrying the brightness detail. The sub-carrier wave is phase modulated in accordance with the particular component color being scanned while the same sub-carrier is amplitude modulated in accordance with the chroma of the color being scanned. The system referred to is described in more detail beginning on page 122 of "Electronics" for November 1949.

The reproduction of the proper color in the receiver is dependent upon accurate timing of the color selection in the receiver. Synchronism is accomplished by the periodic transmission of a 3.58 megacycle "burst" of signal wave equal in frequency to the unmodulated sub-carrier carrying the color information.

A good description of the employment of the "burst" for color synchronization may be found in an article entitled "Recent Developments in Color Synchronization in the RCA Color Television System" published February 1950, by the Radio Corporation of America.

It is a primary object of the present invention to improve the timing of the color selection in a color television receiver.

Another object of this invention is to permit more accurate selection of color information.

According to this invention, a ringing circuit having a frequency of response equal to the burst frequency is excited with the color synchronizing burst signal to develop a reference wave. The developed reference wave is applied in different phases to the color television subcarrier wave to develop different color representative signals for application to a color image reproducing tube. In one form of the invention the burst is separated from the video signal by gating the video signal with a delayed synchronizing pulse. The ringing circuit is followed by an amplifier having a damped coupling circuit responsive to the color synchronizing burst frequency. Positive feedback is employed between the amplifier and the ringing circuit to overcome damping in the ringing circuit.

Other and incidental objects of the invention will become apparent upon a reading of the following specification and inspection of the accompanying drawing which shows by block and circuit diagram one form of the present invention.

Turning now in more detail to the figure of the drawing there is provided a color television receiver 1 which includes the appropriate circuits for developing video signals and sound signals. Suitable color television receivers may be found well shown and described in the publication entitled "General Description of Receivers for the RCA Color Television System Which Employs the RCA Direct-View-Tri-Color Kinescopes" dated April 1950 and published by the Radio Corporation of America. The sound signals are applied to the loud speaker 3.

The video signal obtained from a color television receiver 1 is applied to the control electrode 5 of a color image reproducing device 7. It is not the intention here to limit the practice of the present invention to any single type of color image reproducing device. Any number of devices may be employed such as for example a color kinescope of the type disclosed in U. S. Patent to Alfred C. Schroeder, 2,595,548, dated May 6, 1952 entitled "Picture Reproducing Apparatus." The color kinescope proposed by Mr. Schroeder includes a luminescent screen 9 formed of a multiplicity of small phosphor dots of subelemental dimensions and arranged in groups to be capable of producing the selected component colors when excited by a particular color designated electron beam from gun structure 13. The color kinescope is also provided with an apertured masking electrode 11 located between luminescent screen 9 and the gun structure 13. The apertures of electrode 11 are positioned between the particular component color dot on the phosphor screen 9 and the appropriate color designated gun of the gun structure 13. Each of the guns of the gun structure will therefore produce only one of a plurality of color images on the phosphor screen 9. A suitable deflection yoke 15 or other deflecting means is provided for scanning.

Appropriate scanning deflection energy for deflection coil 15 is supplied by deflection generator 17, which may also take any of the well known forms employed in the television art.

In order to reproduce a designated color in tube 7, it is necessary to appropriately bias the cathodes of the gun structure 13 in order to cause an electron beam to excite the designated color phosphor on screen 9. For the purpose of explanation of the operation of this invention, let us assume that a color selector 19 is arranged to impress upon the cathodes of the gun structure 13 electrical signals representative of the color and chroma of the image to be reproduced. This color selector 19 may consist of a phase and amplitude detector such as shown and described in detail in the co-pending U. S. application of George C. Sziklai, Serial No. 169,594, filed June 22, 1950.

In accordance with the phase detector or modulation sampler illustrated in the application of George C. Sziklai referred to immediately above, three separate phase indicating potentials are developed. Each phase indicating potential is representative of the phase difference between the burst and a different one of the three single frequency datum signals having relative phase displacement with respect to one another of 120°. The phase indicating potentials are then applied respectively to the cathodes of the different electron guns of the gun structure 13. It is, of course, essential to the proper operation of the color selector 19 regardless of the form it might take that it be furnished a control signal accurate in phase and frequency to enable its appropriate color selection.

In order to appropriately time the color selection in the receiver a color synchronizing burst 23 is transmitted immediately following the deflection scanning synchronizing pulses 25. This is shown in the wave form illustrated at the video output of the television receiver 1.

The video signal from the television receiver is applied to a gating tube 27. The gating tube 27 is also supplied with a synchronizing pulse from the color television receiver 1 in the form illustrated by curve 29. In order however to gate tube 27 at the time of the color synchronizing burst 23, the synchronizing signal 29 is passed through a delay line 31. A level setter consisting of a diode 33 and a resistance 35 is employed with gating tube 27.

A ringing circuit 37 consisting of an inductance 39 and at least one capacitor 41 forms a parallel tuned circuit resonant at the burst frequency of 3.58 megacycles. A train of oscillations is produced by ringing this tuned circuit 37 with the burst that passes through gating tube 27. The ringing circuit 37 is preferably of the high Q type. The oscillations produced by the ringing circuit 37 are then passed through a smoothing amplifier consisting of tubes 43 and 45 to provide a substantially constant 3.58 megacycle signal for application to the color selector 19.

The Q of the ringing circuit 37 may be, for example, 150 (including tube loading). The value of 150 is increased to an operating Q of approximately 400 by adding positive feedback through capacity 47.

In order to minimize phase shift in the amplifier stages 43 and 45 following the ringing circuit 37, inter stage coupling elements are heavily damped. This may be accomplished by the relatively low coupling resistors 53 and 55.

In adjustment it is desirable to tune the ringing circuit 37 so that the voltage across it is in phase with the burst. This implies that any additional phase shifts in the smoothing amplifiers 43 and 45 and other parts of the circuit may be corrected without having to tune the ringing circuit 37 away from the burst frequency. This assures a substantially zero phase between the output voltage and the burst throughout the line interval.

Since color fidelity is determined by the accuracy with which the timing of the color selector 19 functions, the performance of the ringing circuit and associated elements in timing the color selector is important.

Having thus described the invention, what is claimed is:

1. In a color television system of the type employing a scanning synchronizing pulse and a color synchronizing burst, a color synchronizing circuit comprising in combination, a signal gating circuit having a signal input terminal, a signal output terminal and a control terminal, means for applying a burst of color synchronizing signal to said input terminal, means for applying a scanning synchronizing pulse to said control terminal, a ringing circuit to develop electrical oscillations, said ringing circuit connected to said gating circuit output terminal, said ringing circuit tuned to the frequency of said burst, a color selector having a frequency control terminal, and a connection between said ringing circuit and said color selector frequency control terminal.

2. In a color television system of the type employing a scanning synchronizing pulse and a color synchronizing burst, a color synchronizing circuit comprising in combination a signal gating circuit having a signal input terminal, a signal output terminal and a control terminal, means for applying a burst of color synchronizing signal to said input terminal, means for applying a scanning synchronizing pulse to said control terminal, a ringing circuit connected to said gating circuit output terminal to develop electrical oscillations having a phase equal to the phase of said burst, said ringing circuit tuned to the frequency of said burst, a color selector having a frequency control terminal, and an amplifier connected between said ringing circuit and said color selector, said amplifier having positive feed back.

3. In a color television system of the type employing a scanning synchronizing pulse and a color synchronizing burst, a color synchronizing circuit comprising in combination a signal gating circuit having a signal input terminal, a signal output terminal and a control terminal, means for applying a burst of color synchronizing signal to said input terminal, means for applying a scanning synchronizing pulse to said control terminal, a ringing circuit connected to said gating circuit output terminal, said ringing circuit tuned to the frequency of said burst and adapted to develop oscillations corresponding in frequency to the frequency of said burst, a color selector having a frequency control terminal, and an amplifier connected between said ringing circuit and said color selector, said amplifier having positive feed back and wherein burst frequency responsive coupling circuits are included in said amplifier and means are provided for damping said coupling circuits.

4. A color television receiver comprising in combination a color selector for controlling color reproduction, and having a control terminal, means for developing horizontal scanning synchronizing pulses, means for developing a video signal including color synchronizing bursts, a signal gating tube having at least a signal control electrode, a gating control electrode and an output circuit, means for applying said video signal to said gating tube signal control electrode, a signal delay circuit, means for applying said horizontal scanning synchronizing pulses to said gating tube gating control electrode through said signal delay circuit, a burst frequency resonant circuit connected in said gating tube output circuit, said burst frequency resonant circuit arranged to develop oscillations, a burst frequency responsive amplifier having positive feed back connected to said burst frequency resonant circuit, said amplifier having an output circuit, said amplifier output circuit connected to said color selector control terminal.

5. In a color television system, apparatus for receiving a signal wave which includes line and field synchronizing pulses and is time division multiplexed in groups of voltages representative respectively of different component colors of a transmitted image and has a color synchronizing burst following each line synchronizing pulse, the receiving apparatus including a plurality of image reproducing means, one for each color represented in the transmission, means for generating at the receiver a reference wave of substantially the same frequency as the recurrence of the groups of color voltages modulating the received wave, said means including a high Q ringing circuit responsive to the frequency of the individual oscillations of the bursts and means for applying the reference wave to the received signal at different phases of the reference wave to enable the image reproducing means to reproduce the signals in the respective colors.

6. Apparatus according to claim 5 comprising circuits for gating by the line synchronizing pulses the application of the bursts to the ringing circuit.

7. Apparatus according to claim 5 in which circuits succeeding the ringing circuit make the reference wave of substantially constant amplitude before it is applied to the received signal.

8. Apparatus according to claim 6 comprising a multi-grid tube, a circuit for applying the received signal to a grid of said tube, and a circuit for applying line synchronizing pulses to another grid of the tube to gate the application of the bursts to the ringing circuit.

9. Apparatus according to claim 6 in which the last-mentioned circuit contains means for delaying the synchronizing pulse to make its leading edge coincide in time with the beginning of the burst.

10. In a color television system, apparatus for receiving a signal wave which includes line synchronizing pulses and is time division multiplexed in groups of voltages representative respectively of different component colors of a transmitted image, said groups of voltages succeeding each other in elemental sequence substantially over each elemental area of the image and each of the line synchronizing pulses followed by bursts each of which is composed of a group of oscillations having substantially the same frequency as the sequence of the time division multiplexing, the receiving apparatus including means for producing a reference wave of substantially the same frequency as the sequence of the multiplexing, said means including a high Q ringing circuit and means associated therewith for deriving from said circuit a reference wave of substantially constant amplitude, a plurality of image reproducing means, one for each of the colors in which the image is transmitted, and means for employing the reference wave at different respective phases of the wave to derive from the modulating voltages signals representative of different component colors of the transmitted image, and means for applying the last-mentioned signals to the respective image reproducing means at substantially elemental sequential frequencies.

11. A color television receiver comprising in combination apparatus for receiving a signal wave which includes line and field synchronizing pulses, a color synchronizing burst following each line synchronizing pulse, and a subcarrier wave phase and amplitude modulated in accordance with color information, said color television receiver apparatus also including means for reproducing an image in color, means for generating at the receiver a reference wave of substantially the same frequency as the individual oscillations of said color synchronizing bursts, said reference wave generating means including a high Q ringing circuit responsive to the frequency of the individual oscillations of said color synchronizing burst, means for operatively applying said color synchronizing burst to said reference wave generating means, and means for operatively applying the reference wave to said subcarrier wave of the received signal wave at different phases of the reference wave to enable the image reproducing means to reproduce the image in color.

References Cited in the file of this patent

UNITED STATES PATENTS

| | | |
|---|---|---|
| Re. 22,390 | Lewis | Nov. 9, 1943 |
| 2,251,929 | Freeman | Aug. 12, 1941 |
| 2,319,789 | Chambers | May 25, 1943 |
| 2,378,746 | Beers | June 19, 1945 |
| 2,468,058 | Greig | Apr. 26, 1949 |
| 2,522,706 | Di Tono | Sept. 19, 1950 |
| 2,546,972 | Chatterjea | Apr. 3, 1951 |
| 2,601,516 | Gray | June 24, 1952 |